United States Patent
Pintz et al.

(10) Patent No.: US 6,871,008 B1
(45) Date of Patent: Mar. 22, 2005

(54) SUBPICTURE DECODING ARCHITECTURE AND METHOD

(75) Inventors: Sandro H. Pintz, Menlo Park, CA (US); Vijay Kamarshi, Santa Clara, CA (US); Teju J. Khubchandani, Sunnyvale, CA (US)

(73) Assignee: Genesis Microchip Inc., Alviso, CA (US)

( * ) Notice: Subject to any disclaimer, the term of this patent is extended or adjusted under 35 U.S.C. 154(b) by 0 days.

(21) Appl. No.: 09/476,698

(22) Filed: Jan. 3, 2000

(51) Int. Cl.[7] ............................................. H04N 5/91
(52) U.S. Cl. ..................................... 386/95; 386/126
(58) Field of Search ........................... 386/45, 46, 95, 386/98, 125, 126; 348/564

(56) References Cited

U.S. PATENT DOCUMENTS

| | | | |
|---|---|---|---|
| 5,758,007 A | * 5/1998 | Kitamura et al. | 386/45 |
| 5,963,704 A | * 10/1999 | Mimura et al. | 386/95 |
| 5,995,161 A | * 11/1999 | Gadre et al. | 348/564 |

* cited by examiner

*Primary Examiner*—Huy Nguyen
(74) *Attorney, Agent, or Firm*—Beyer Weaver & Thomas LLP

(57) ABSTRACT

In a system for processing and displaying a DVD-video data stream, a system for decoding and processing a subpicture data stream. The subpicture data stream comprises a subpicture pixel data stream and a subpicture display control data stream. The subpicture display control data stream preferably comprises one or more display control commands, one or more of which include subpicture display control information. The system comprises at least one processing unit for processing software programmed to perform at least some subpicture data stream decoding and subpicture display control command execution. In addition, the system further comprises a subpicture hardware unit configured to receive the subpicture pixel data stream, subpicture control information extracted from a subpicture display control command executed by said at least one processing unit, and subpicture display control commands not executed by said at least one processing unit. After receiving the information, the subpicture hardware unit generates subpicture display information, which is presented to a DVD video display unit. The subpicture-display information preferably comprises pixel color and contrast information.

27 Claims, 15 Drawing Sheets

40134700:  92839050   07130065   2039c065   06021300
40134710:  59282108   83134313   02120065   28055000
40134720:  00048213   c0453404   93435050   06104439
40134730:  c1d24351   039c1d06   02138045   342108c2
40134740:  d342d342   12021835   38045000   000b4250
40134750:  54290502   1010c1d0   6421281d   01002101
40134760:  f0211419   05825000   0003fc02   c8210000
40134770:  03fc02c8   21000003   fc02c821   000003fc
40134780:  02c82100   0003fc02   c8210000   00000000
40134790:  00000000   00000000   00000000   00000000
401347a0: [000007a6] [03af0a04]  fff00506   e2610c81
401347b0:  2b060004   03bc01ff] [01b707c2   07001600
401347c0:  c8212b00   6eaf0a00   000088af   0afff00f
401347d0:  ffffffff  [01e607de   07001600   c8212b00
401347e0:  6eaf0a00   0000a3af   0afff00f   ffffffff
401347f0:  02150d20   fdf10000] [00000000   00000000
```

Fig. 7B

| b31 | b30 | b29 | b28 | b27 | b26 | b25 | b24 |
|---|---|---|---|---|---|---|---|
| | reserved (350) | | | | | Change start line number (upper bits) | |
| b23 | b22 | b21 | b20 | b19 | b18 | b17 | b16 |
| Change start line number (lower bits) (354) | | | | | | | |
| b15 | b14 | b13 | b12 | b11 | b10 | b9 | b8 |
| Number of changes (356) | | | | reserved | | Change termination line number (upper bits) | |
| b7 | b6 | b5 | b4 | b3 | b2 | b1 | b0 |
| Change termination line number (lower bits) (362) | | | | | | | |

SUBPICTURE DECODING ARCHITECTURE AND METHOD

BACKGROUND OF THE INVENTION

The present invention relates generally to methods and apparatus for processing subpicture data of a DVD-video stream, and more particularly, to a novel subpicture processing system which divides subpicture processing functionality between software and a subpicture processing hardware unit.

DVD-video supports up to 32 subpicture streams that overlay the video for subtitles, captions, karaoke lyrics, closed caption lyrics, menus, simple animation, and so on. These are part- to full-screen, run-length encoded bitmaps limited to four pixel values. Each pixel is represented by two bits, allowing four types. The four pixel types are defined as background, pattern (foreground), emphasis-1, and emphasis-2. However, the pixel types are not necessarily tied to the four defined types. Each pixel type is associated with one color from a palette of 16 colors, and one contrast, or transparency level. In many applications, the palette of 16 colors is selected from a 256 color table. However, as one skilled in the art will appreciate, the color table could comprise many more color entries. The contrast or transparency level can be set directly, from invisible (0), through 14 levels of transparency (1–14), to opaque (15).

The display for the subpicture can be any size, up to almost a full screen rectangle. The display area and the content can be changed for each frame or field. Similarly, the color and contrast of the four pixel types can be changed for each frame or field. The subpicture display commands (DCCMDs) are used to change the location, scroll position, transparency, and so on, of the subpicture graphic. A sequence of commands can be used to create effects such as color changes, moving highlights, fades, crawls, etc., on the fly.

With subpicture, pixel parameters quite often must change on a pixel-by-pixel basis in real time. Such performance requires that some kind of hardware acceleration be used to decode the subpicture data stream and present it to the display hardware of the DVD system in real time. However, as one skilled in the art will appreciate, many of the subpicture display commands do not require pixel-by-pixel, real time changes, and thus do not need the hardware acceleration. Unfortunately, all of the prior art DVD systems use subpicture hardware units to perform all subpicture tasks.

The subpicture unit specification is quite complex and has been a well-known headache for hardware developers at almost all companies developing DVD playback systems. Thus, developing subpicture processing functionality that is error free is a very difficult task. If all of the subpicture decode functionality is embedded in an ASIC hardware unit as currently is the case, and an error exists, it can be very expensive to fix the error. In most instances, the hardware unit must be redesigned to fix the bug. This requires new design and manufacturing efforts every time a bug is found.

Since most of the subpicture functionality does not require real time, hardware acceleration, it is preferably to handle the functionality not requiring acceleration in software. That way, if there are errors in the subpicture design, the errors can easily be corrected with code changes, not complex ASIC redesigns. Thus, what is needed is a DVD processing system which includes subpicture functionality being handled by both hardware and software, not just hardware.

SUMMARY OF THE INVENTION

In accordance with the invention, in a system for processing and displaying a DVD-video data stream, a system for decoding and processing a subpicture data stream. The subpicture data stream comprises a subpicture pixel data stream and a subpicture display control data stream. The subpicture display control data stream preferably comprises one or more display control commands, one or more of which include subpicture display control information.

The system comprises at least one processing unit for processing software programmed to perform at least some subpicture data stream decoding and subpicture display control command execution. In addition, the system further comprises a subpicture hardware unit configured to receive the subpicture pixel data stream, subpicture control information extracted from a subpicture display control command executed by said at least one processing unit, and subpicture display control commands not executed by said at least one processing unit. After receiving the information, the subpicture hardware unit generates subpicture display information, which is presented to a DVD video display unit. The subpicture display information preferably comprises pixel color and contrast information.

In accordance with another aspect of the present invention, the system may further comprise a memory for storing the subpicture pixel data stream and the subpicture display control data stream extracted from the subpicture data stream. Preferably, the subpicture pixel data stream and the subpicture display control data stream in stored in the memory prior to the at least one processing unit and the subpicture hardware unit processing the subpicture pixel data stream and the subpicture display control data stream.

As mentioned above, the at least one processing unit is configured to execute one or more subpicture display control commands extracted from the subpicture display control data stream. In accordance with one embodiment of the present invention, the at least one processing unit is configured to execute the following display control commands: FSTA_DSP, STA_DSP, SET_COLOR, SET_CONTR, SET_DAREA, SET_DSPXA, AND CMD_END. To execute the display control commands, the at least one processing unit extracts subpicture display control information from the subpicture display control commands and transmits the subpicture display control information to one or more registers in the subpicture hardware unit. The subpicture hardware unit uses the subpicture display control information in conjunction with the subpicture pixel data to generate subpicture display information.

In accordance with another aspect of the present invention, the subpicture hardware unit is configured to process real time, pixel-by-pixel subpicture display control commands, such as the change color/contrast command (CHG_COLCON). To process the real time, pixel-by-pixel subpicture display control commands, the subpicture hardware unit receives the subpicture display control commands, along with the pixel data associated with the display control commands. The subpicture hardware unit extracts subpicture display control information from the display control commands by decoding and processing the display control commands. The subpicture hardware unit then uses the subpicture display control information in conjunction with the pixel data to generate subpicture display information.

A more complete understanding of the present invention may be derived by referring to the detailed description of preferred embodiments and claims when considered in connection with the figures, wherein like reference numbers refer to similar items throughout the figures.

BRIEF DESCRIPTION OF THE DRAWINGS

FIG. 7a is the first half of a string of code for one particular example of a subpicture data stream;

FIG. 7b is the second half of a string of code for one particular example of a subpicture data stream;

FIG. 13 is a block diagram illustrating the bit layout of line control information (LN_CTLI) of a CHG_COLCON command.

DESCRIPTION OF THE SPECIFIC EMBODIMENTS

The present invention relates generally to methods and apparatus for processing subpicture data of a DVD-video stream, and more particularly, to a novel subpicture processing system which divides subpicture processing functionality between software and a subpicture processing hardware unit.

In accordance with the present invention, it is preferable for a subpicture hardware unit to process subpicture display control commands that should be performed on pixels in real time, and allow software applications to process those subpicture display control commands that are not timing critical. In this manner, the software functionality is more easily modified, thus making it more flexible and easier to correct run-time errors.

In accordance with one embodiment of the present invention, the system is configured so that software handles the functions that do not require real time or instantaneous processing, such as, parsing the DVD data stream into its separate units (i.e., video unit, audio unit, navigation unit, subpicture unit, etc.), decoding the subpicture unit SPU packs, setting-up of suitable data structures in memory, loading the data structures with pixel data (PXD) and the display control sequence table (SP_DCSQT), and executing the non-pixel-by-pixel display commands. Non-pixel-by-pixel display commands include such commands as forced set display start timing of pixel data (FSTA_DSP), set display start timing of pixel data (STA_DSP), set display stop timing of pixel data (SET_DSP), set color code of pixel data (SET_COLOR), set contrast between pixel data and main picture (SET_CONTR), set display area of pixel data (SET_DAREA), set display start address of pixel data (SET_DSPXA), and end of display control command (CMD_END), to name a few. The various display control commands will be discussed in more detail below.

Preferably, the subpicture hardware unit is configured to execute those functions that require real time, pixel-by-pixel actions. Such functions may include, receiving and decoding PX_CTLI control words, executing PX_CTLI control words at the proper time, receiving and performing run-length decoding of PXD data, and determining the proper color and contrast values for each subpicture display pixel.

Figure 1:
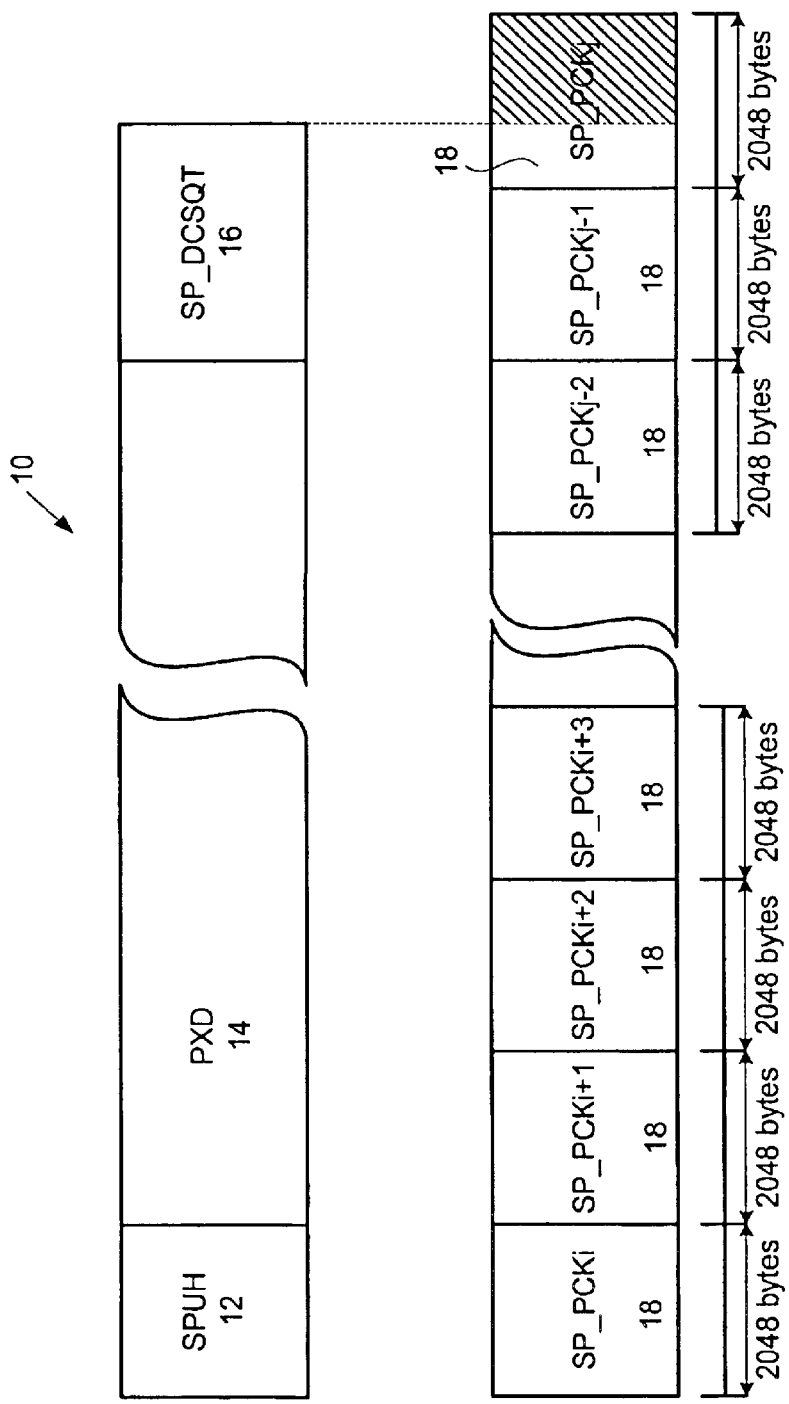
FIG. 1 is a block diagram illustrating a subpicture data stream, which comprises a plurality of subpicture packs.

Referring now to FIG. 1, the structure of a subpicture unit (SPU) 10 will be discussed. SPU 10 comprises a subpicture unit header (SPUH) 12, pixel data (PXD) 14 and a subpicture display control sequence table (SP_DCSQT) 16, which, as discussed in more detail below includes a plurality of subpicture display control commands (SP_DCCMD). As one skilled in the art will appreciate, SPU 10 is made up of a plurality of subpicture packs (SP_PCK) 18, which comprise blocks of 2048 bytes of data.

Figure 2:
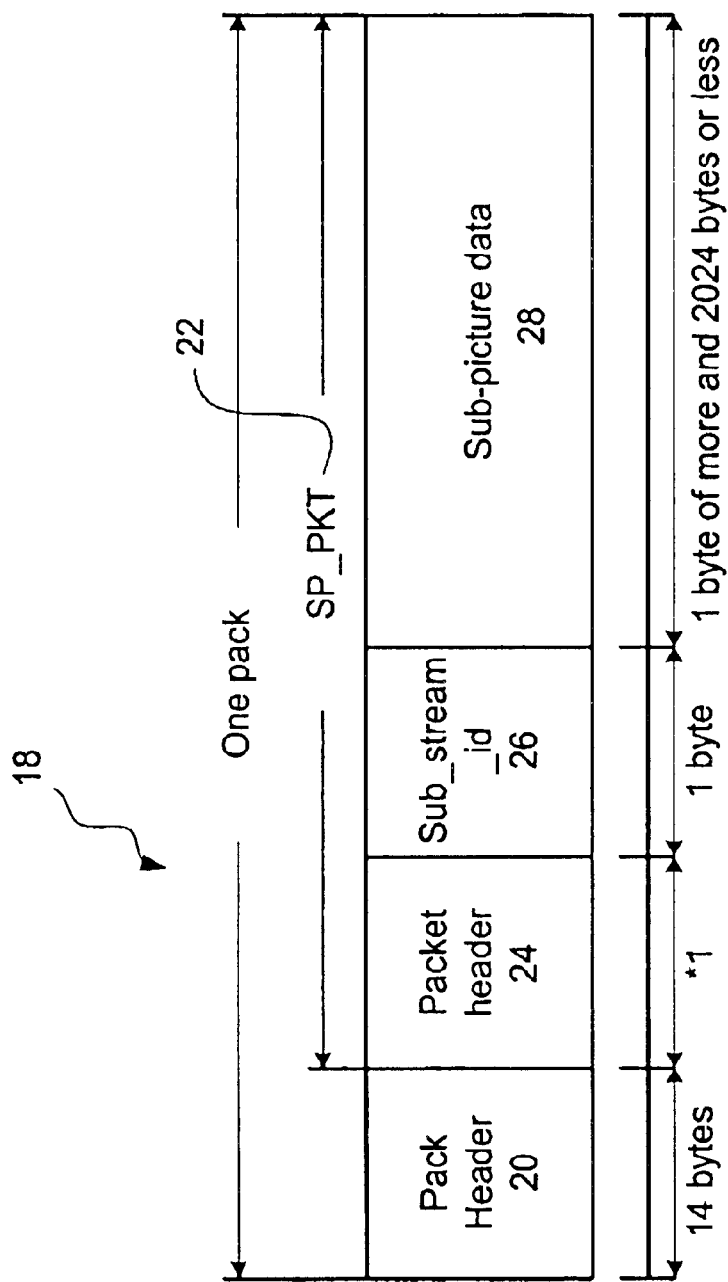
FIG. 2 is a block diagram illustrating the format of a subpicture pack.

Referring now to FIG. 2, a single SP_PCK 18 is illustrated. SP_PCK 18 comprises a pack header 20, and one or more subpicture packets (SP_PKT) 22. While SP_PCK 18 is shown as comprising only one SP_PKT 22, one skilled in the art will appreciate that SP_PCK 18 may comprise a plurality of SP_PKTs 22, so long as SP_PCK 18 remains 2048 bytes. SP_PKT 22 comprises a packet header 24, which may be between 9 and 24 bytes long, a sub_stream_id 26, which is 1 byte, and sub-picture data 28, which may be 1 or more bytes, but not more than 2024 bytes. The sub-picture data may be data from SPUH 12, PXD 14, or SP_DCSQT 16. While packet header 24 may be between 9 and 24 bytes long, in accordance with the example set forth herein, packet header 24 preferably is 17 bytes long and includes the fields defined in Table 1.

TABLE 1

| Field | Number of Bits | Number of Bytes | Value |
| --- | --- | --- | --- |
| packet_start_code_prefix | 24 | 3 | 000001h |
| stream_id | 8 | 1 | 10111101b |
| PES_packet_length | 16 | 2 | |
| Misc. Control Variables | 64 | 11 | |

Figure 3:
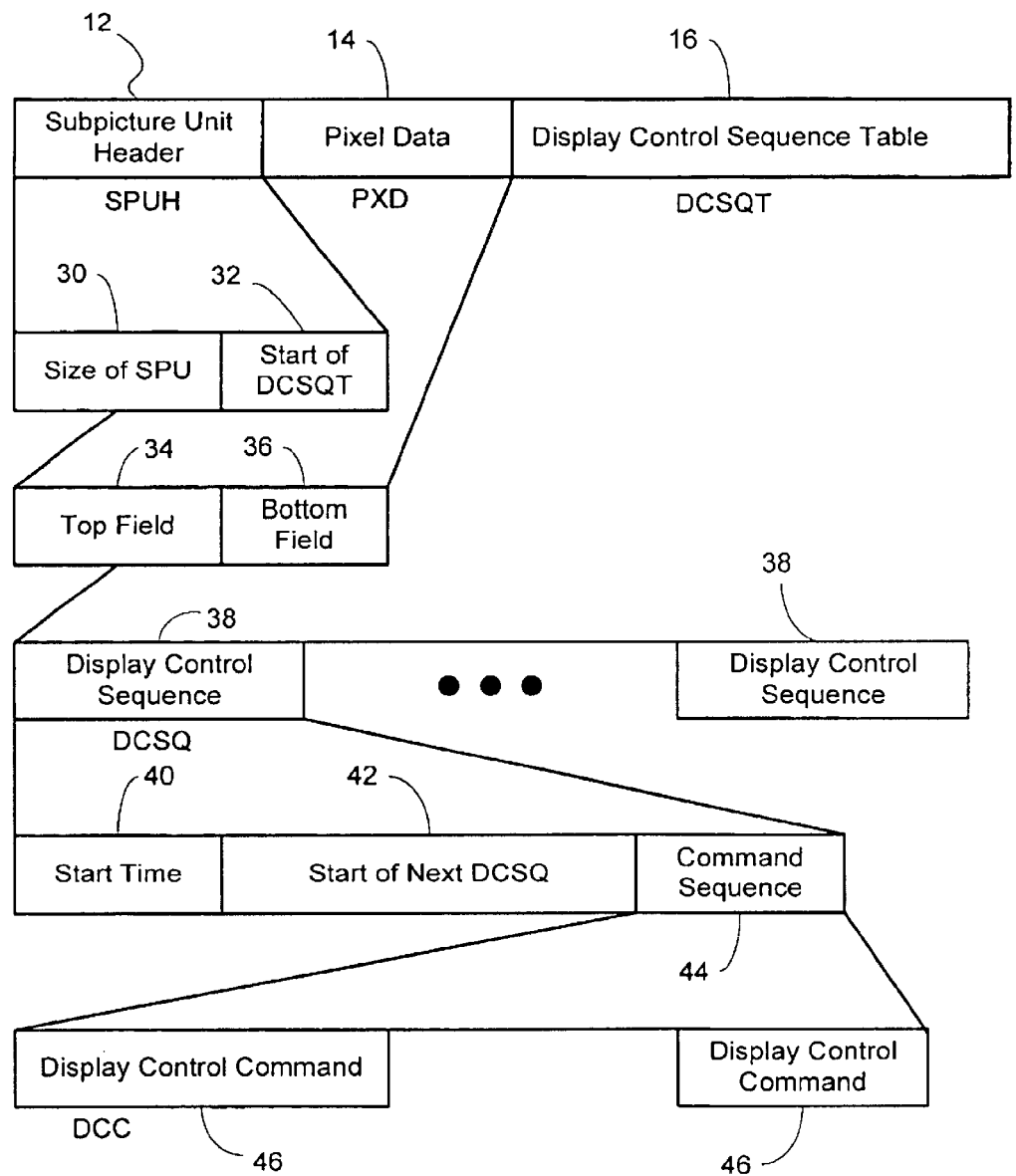
FIG. 3 is a block diagram illustrating the components of a subpicture data stream.

Referring now to FIG. 3, the break-down of SPU 10 is illustrated. As discussed above, SPU 10 comprises a sub-picture unit header (SPUH) 12, pixel data (PXD) 14 and a display control sequence table (SP_DCSQT) 16. SPUH 12 is 4 bytes long and comprises two fields; size of the SPU (SPU_SZ) 30, and a start address of $SP_{13}$ DCSQT (SP_DCSQT_SA) 32. Both SPU_SZ 30 and SP_DCSQT SA 32 are 2 bytes long. SPU_SZ 30 defines the size of SPU 10 in number of bytes. The maximum SPU size is 53220 bytes. SP_DCSQT_SA 32 defines the start address of SP_DCSQT 16 as a relative byte number (RBN) from the first byte of the SPU.

PXD 14 is the data compressed from the bitmap data defining the subpicture display. Run-length compression is used to compress the bitmap data into the PXD data stream. Run-length compression techniques are well known in the art, and therefore, will not be discussed in detail herein. As illustrated in FIG. 3, PXD 14 can be divided into top field data 34 and bottom field data 36, which as understood by one skilled in the art, is used to generate interleaved display signals, for example in accordance with NTSC or PAL. The pixel data values can be one of four different types of pixel types. The pixel data values are assigned as shown in Table 2.

TABLE 2

| Pixel Name | Pixel Data |
| --- | --- |
| Background Pixel | 00 |
| Pattern Pixel | 01 |
| Emphasis Pixel-1 | 10 |
| Emphasis Pixel-2 | 11 |

SP_DCSQT 16 is a table of display control sequences (SP_DCSQ) 38, which control the display characteristics of the subpicture (e.g., start time, stop time, size, location, color, contrast, etc.). Each SP_DCSQ 38 comprises a start time field (SP_DCSQ_STM) 40, a start address of the next SP_DCSQ field (SP_NXT_DCSQ_SA) 42, and a command sequence field 44 which may include one or more display control commands (SP_DCCMD) 46. SP_DCSQ_STM 40 is 2 bytes, SP_NXT_DCSQ_SA is 2 bytes, and the size of command sequence field 44 will vary with the number and types of SP_DCCMDs 46 in command sequence field 44. The different types of commands SP_DCCMD 46 are set forth in Table 3.

TABLE 3

| Command Name | Function | Code | No. of Extended Fields |
| --- | --- | --- | --- |
| (1) FSTA_DSP | Forcedly sets display start timing of pixel data | 00h | 0 bytes |
| (2) STA_DSP | Sets display start timing of pixel data | 01h | 0 bytes |
| (3) STP_DSP | sets display stop timing of pixel data | 02h | 0 bytes |
| (4) SET_COLOR | Sets color code of pixel data | 03h | 2 bytes |
| (5) SET_CONTR | Sets contrast between pixel data and main picture | 04h | 2 bytes |
| (6) SET_DAREA | Sets display area of pixel data | 05h | 6 bytes |
| (7) SET_DSPXA | Sets display start address of pixel data | 06h | 4 bytes |
| (8) CHG_COLCON | Sets change of color and contrast for pixel data | 07h | PCD size + 2 bytes |
| (9) CMD_END | End of Display Control Command | FFh | 0 bytes |

The operation of the commands in Table 3 will be discussed in more detail below.

Figure 4:
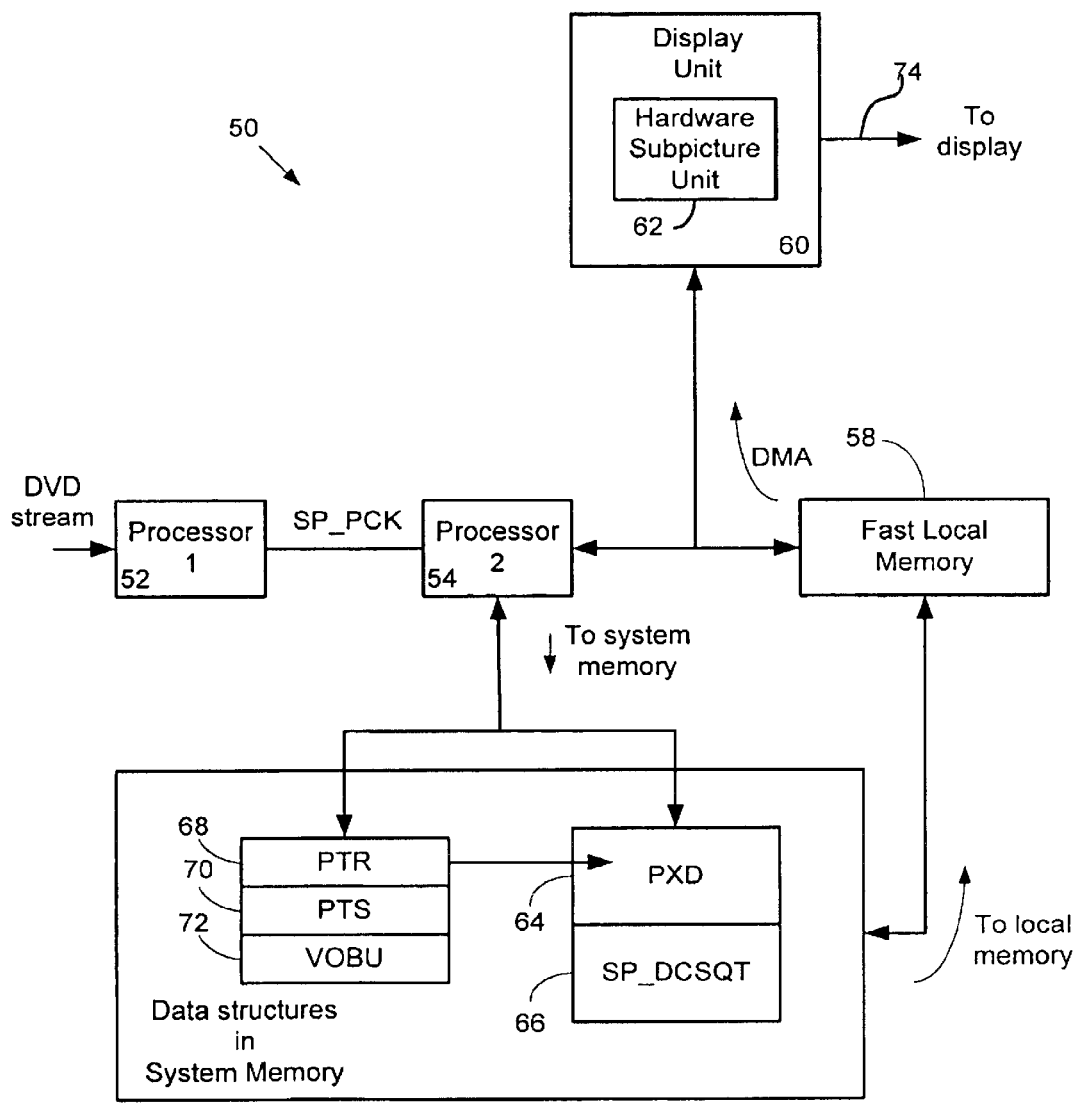
FIG. 4 is a block diagram illustrating one embodiment of a system for decoding and processing a subpicture data steam.

Referring now to FIG. 4, one embodiment of a subpicture decode and execution system 50 is shown. In accordance with the illustrated embodiment, system 50 comprises a first processing unit 52, a second processing unit 54, a system memory 56, a local memory 58, and a display unit 60. First processing unit 52 receives a DVD-video data stream and parses the stream into its separate packs. For example a DVD data stream may include video packs (V_PCK), audio packs (A_PCK), navigation packs (NV_PCK), and subpicture packs (SP_PCK). For processing of the subpicture packs (SP_PCK), preferably first processing unit 52 extracts the SP_PCKs 18 (see FIG. 1) and forwards them to second processing unit 54.

Second processing unit 54 receives the SP_PCKs 18 and assembles them so that an entire subpicture unit data stream (SPU) 10 is present. Then second processing unit 54 defines data structures in system memory 56 to store subpicture pixel data (PXD) 14 and subpicture control command data (SP_DCSQT) 16. Preferably, second processing unit 54 defines a fist data structure 64 to hold PXD 14, and a second data structure 66 to hold SP_DCSQT 16. In addition, other data structures or registers may be present in system memory 56 to hold a PXD pointer (PTR), a pointer time stamp (PTS), which indicates when the PXD data pointed to by pointer PTR will be needed by the display unit, and video object unit (VOBU) information. As one skilled in the art will appreciate, VOBU information includes information, such as presentation starting time, presentation termination time, and the presentation period for a video object unit. In the illustrated embodiment, the PTR is stored in data structure or register 68, the PTS is stored in data structure or register 70, and the VOBU information is stored in data structure or register 72. By using these data structures, second processing unit 54 can decode the SP_PCK packs 18 well prior to when the pixel data and control data is needed, and then store the data in memory until it is used. When it is time to present the data for display, a time manager module in second processing unit 54 transfers PXD data 14 and commands from SP_DCSQT data 16 into fast local memory 58, which may reside in or in close proximity to second processing unit 54. That is, fast local memory 58 may be the cache memory in second processing unit 54, or some other suitable high speed memory in system 50. From fast local memory 58, a DMA mechanism presents the SPU data (PXD and SP_DCCMD commands) to the input FIFO's of subpicture hardware unit 62. The configuration and operation of subpicture hardware unit 62 will be described in greater detail below with reference to FIG. 6.

Figure 5:
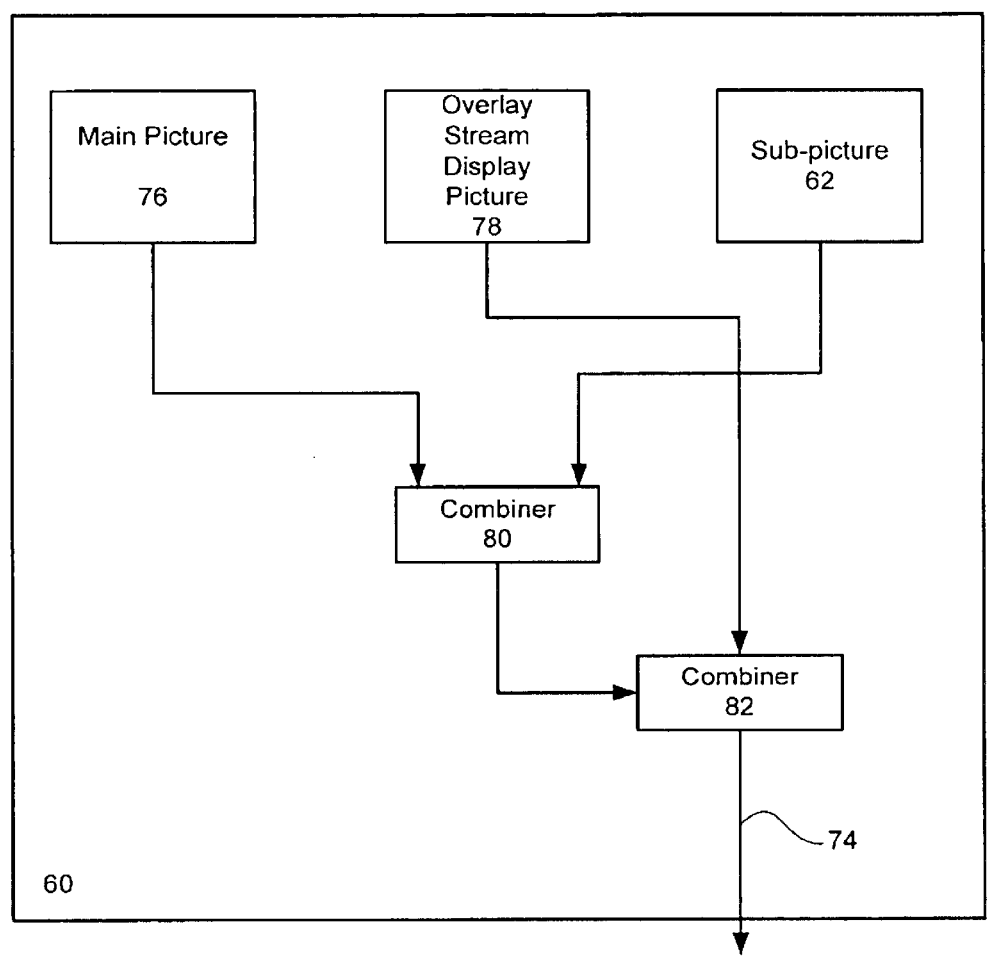
FIG. 5 is a block diagram illustrating a display unit in accordance with one embodiment of the present invention.

After subpicture hardware unit 62 processes the subpicture data and commands to generate a subpicture graphical data stream, display unit 60 combines the subpicture graphical data stream with a main picture data steam and an overlay display data stream. As illustrated in FIG. 5, display unit 60 preferably comprises a first combiner circuit 80 for combining data from a main picture processing unit 76 with data from subpicture hardware unit 62. A second processing unit 82 receives the output from first combiner circuit 80 and combines it with data from an OSD processing unit 78. At this point, main picture data, OSD data and subpicture data all are combined together into a single signal 74 and output to an A/D converter and then to a display device, such as a TV or computer monitor.

Figure 6:
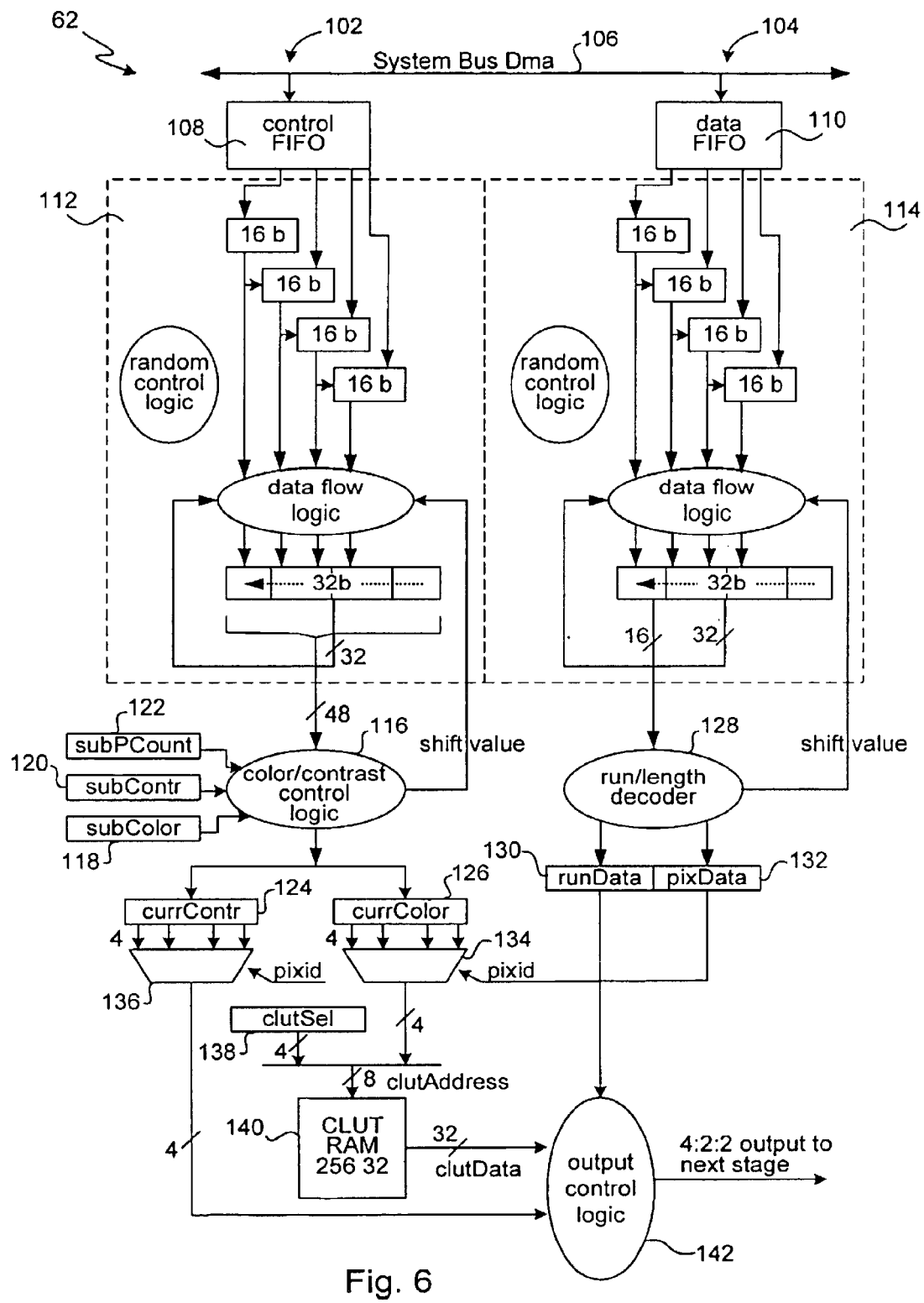
FIG. 6 is a block diagram of a subpicture hardware unit in accordance with one embodiment of the present invention.

Referring now to FIG. 6, the configuration and operation of subpicture hardware unit 62 will be described. In particular, subpicture hardware unit 62 comprises two parallel execution pipelines or data paths 102 and 104. Pipeline 102 is configured to process control data (PX_CTLI), while pipeline 104 is configured to process the run-length compressed PXD data. As discussed above, software can process most subpicture control commands except the change color/contrast command (CHG_COLCON). As discussed in more detail below, the CHG_COLCON command comprises one or more PX_CTLI commands embedded therein. Thus, pipeline 102 is configured to process these PX_CTLI commands. As discussed in more detail below, the PX_CTLI commands are transferred to a control data FIFO buffer 108 via a system bus DMA 106. From control data FIFO buffer 108, the PX_CTLI commands pass into and ar processed by command processing logic 112. Similarly, the PXD data is transferred into a PXD FIFO buffer 110 via system bus DMA 106. From the PXD data FIFO buffer 110, the PXD data is decoded and processed by PXD processing logic 114 and run-length decoder 128. The configuration and operation of command processing logic 112, PXD processing logic 114, and run-length decoder 128 are currently known in the art, and therefore, will not be discussed in detail herein.

Referring now to FIGS. 7a, 7b and 8–14, the operation of subpicture processing system 50 and subpicture hardware unit 62 will now be discussed by way of example. As discussed above, first processing unit 52 preferably receives a DVD data stream and separates the stream into its separate packs. First processing unit 52 then extracts the SP_PCKs and forwards them to second processing unit 54 for further decoding and execution. The combination of the SP_PCKs make-up the SPU. In accordance with the particular example set forth herein, FIGS. 7a and 7b illustrate a data stream of a particular SPU 150. SPU 150 comprises two SP_PCKs 152 and 154, each of which are 2048 bytes. The information in the left most column 156 of the data stream of SPU 150 sets forth the address of the data in the corresponding row. The information in columns 158 is the data of SPU 150.

Referring to first SP_PCK 152 of SPU 150, the processing preformed by second processing unit 54 will be discussed. In particular, processing unit 54 retrieves and analyzes first row 160 of SPU 150. Row 160 is as follows:

40134000
   000001bd 07ec8181 08210001 77e31e60 3a200bd4 078e0000 00000000 00000000

In this particular example, the pack header has been stripped away from the data stream. Therefore, the remaining information relates to the packet within the SP_PCK. Thus, the first 17 bytes of data relate to packet header 24 (see FIG. 2). The first three bytes of the packet header are the packet_start_code_prefix 162, which has the value 000001 hex (see Table 1). The next byte of the packet header is the stream_id 164, which has the value "bd" hex (10111101 binary). Stream_id "bd" means that the pack is a subpicture pack. The next two bytes of the packet header is the PES_packet_length 166, which has a value "07ec" (decimal value is 2028). PES_packet_length 166 indicates the length of the packet, which includes the packet header, sub_stream_id, and subpicture data. Thus, in this particular case, the packet length is 2028 bytes long. The remainder of the packet header comprises various control variables 168 that make up 11 bytes of data (8181 .................. 3a). Finally, there is a sub_stream_id 172 (in row 70), which has the value "20"; specified to be 001XXXXX. Since this is the first SP_PCK 152 of SPU 150, the first part of the subpicture data portion of the packet will provide us with the SPUH (subpicture header) information.

The SPUH is four bytes and comprises SPU_SZ (size of the subpicture unit) and SP_DCSQT_SA (start address of the display control sequence table), each of which are two bytes. The two bytes immediately following sub_stream_id 172 is the SPU_SZ 174, which has the value "0bd4" hex (=3028 bytes). The next two bytes is the SP_DCSQT_SA 176, which has the value "078e". SP_DCSQT_SA 176 is given as a RBN (Relative Byte Number) from the first byte of the SPU. In this case, the first byte of the SPU is at 40134012 (the data after the packet header). Hence, the start address of the Display Control Sequence Table (SP_DCSQT) is 4013412+078e=401347a0 (row 178 in second SP_PCK 154). Since an SPU is organized as SPUH followed by PXD and then followed by SP_DCSQT (see FIG. 1), the bytes following the header and before the given address of the SP_DCSQT is the PXD (pixel data) 180. Processing unit 54 will extract the complete PXD and store it in system memory 56 for later use.

The next step is to obtain the control sequence from the SP_DCSQT and build the data structure in system memory 56. Preferably, the whole SP_DCSQT is stored into system memory 56. At the address 401347a0 (line 178), the first Display Control Sequence (SP_DCSQ) of a SP_DCSQT is defined. Within an SP_DCSQ, the first two bytes is the SP_DCSQ_STM (start time of SP_DCSQ) 182, which is "0000" in this case. The next two bytes is the SP_NXT_DCSQ_SA (address of the next SP_DCSQ) 184, which has a value of "07a6." The value of SP_NXT_DCSQ_SA 184 is given as a RBN (Relative Byte Number) from the first byte of the SPU. Thus, the next SP_DCSQ is at address 40134012+07a6=401347b8 (byte 188 in row 186). With this information, second processing unit 54 extracts all the SP_DCCMD fields from the SPU for the first SP_DCSQ.

As set forth above, the SP_DCCMDs can be one of nine possible control commands. The control commands are set forth above in Table 3. As discussed above, all commands except the CHG_COLCON (change color contrast) command can be handled by software run by second processing unit 54. Because the CHG_COLCON command requires pixel-by-pixel changes, this command preferably is executed by subpicture hardware unit 62. For CHG_COLCON commands, second processing unit 54 preferably parses the SP_DCCMD fields and extracts the PXCD information. Within the PXCD, there is line control information (LN_CTLI), which can be handled in software (line by line changes), and pixel control information (PX_CTLI), which typically is handled by subpicture hardware unit 62. This will be discussed in further detail below.

In accordance with this particular example, the first display control sequence 190 is:

"03af0a04 fff00506 e2610c81 2b060004 03bc01ff"

extracted from lines 178 and 186.

Figure 8:
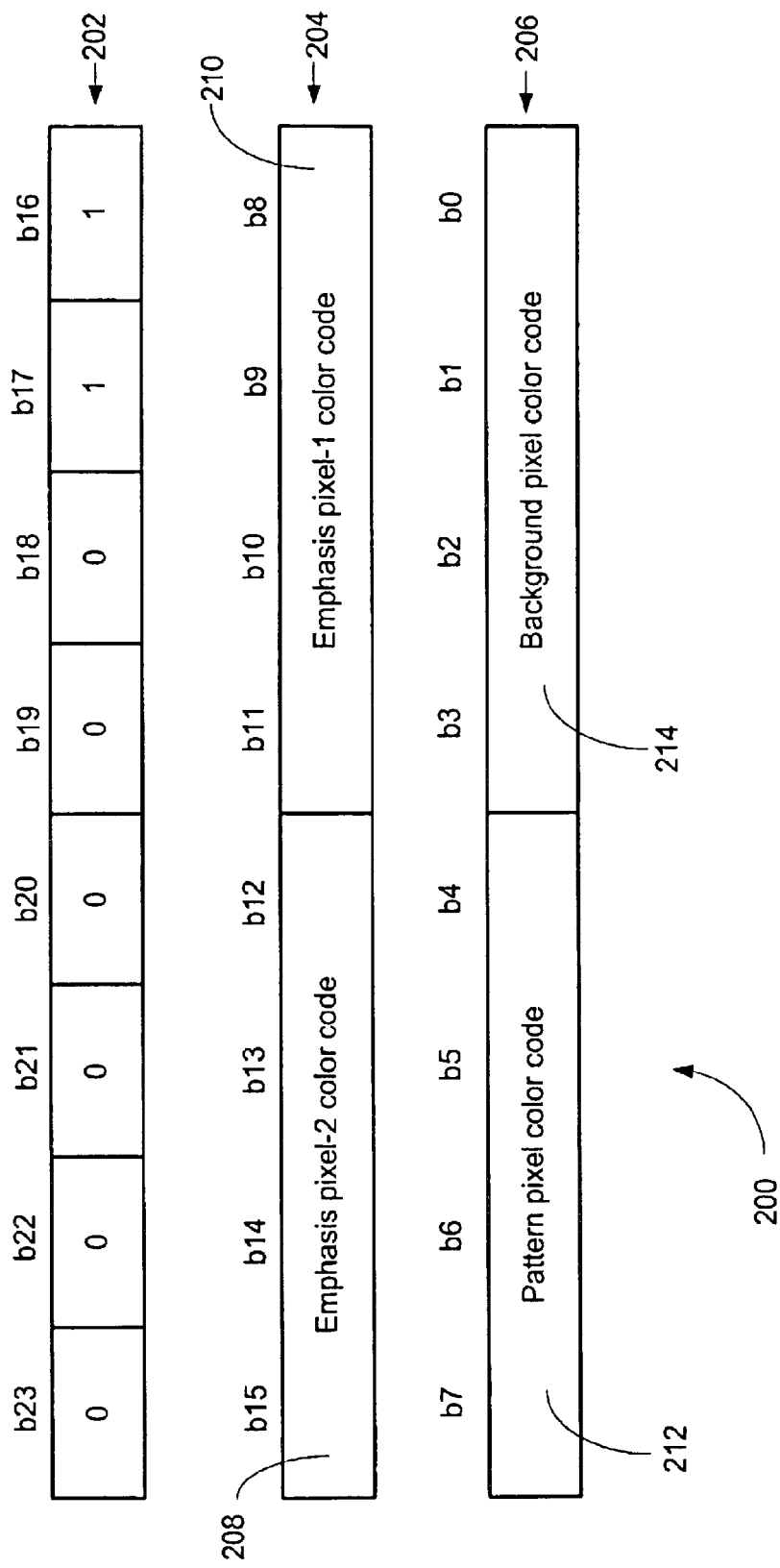
FIG. 8 is a block diagram illustrating the bit layout of a set color (SET_COLOR) command.

The first two bytes of the SP_DCCMD command define the type of command. In this case the first two bytes are "03," which means that the first command is a SET_COLOR command (see Table 3). FIG. 8 illustrates the structure 200 of a SET_COLOR command. In particular, SET_COLOR command 200 comprises three bytes 202, 204, 206. Byte 202 is the command code for the SET_COLOR command and has the value "03". Byte 204 and 206 include four 4-bit values which define four different pixel colors. For example, byte 204 includes Emphasis pixel-2 color code field 208, and Emphasis pixel-1 color code field 210. Byte 206 includes Pattern pixel color code field 212, and Background pixel color code field 214. As discussed in more detail below, a 2-bit pixel value is used to select one of the four different color codes.

In accordance with this particular example, the SET_COLOR command has the value "03af0a" Thus, Emphasis pixel-2 color code field 208 has the value "a" (1010 binary), Emphasis pixel-1 color code field 210 has the value "f" (1111 binary), Pattern pixel color code 212 has the value "0" (0000 binary), and Background pixel color code 214 has the value "a" (1010 binary). Preferably second processing unit 54 will store the command data in memory, and then extracts it from memory and issue it to subpicture hardware unit 62 at the appropriate time. Because software in second processing unit 54 decodes and executes the SET_COLOR command, the command does not need to pass through pipeline 102 of subpicture hardware unit 62. Rather, the color values (fields 208–214) are transmitted directly into a subpicture color register 118 in hardware unit 62. From register 118, the color values pass through color/contrast control logic unit 116 into a current color register 126. Preferably, the color values are transmitted from second processing unit 54 into register 118 via a communication bus, which allows processing units within system 50 to communicate directly with memory and specific registers in other processing units of system 50. In this case, second processing unit 54 transmits data directly into register 118 of subpicture hardware unit 62.

Figure 9:
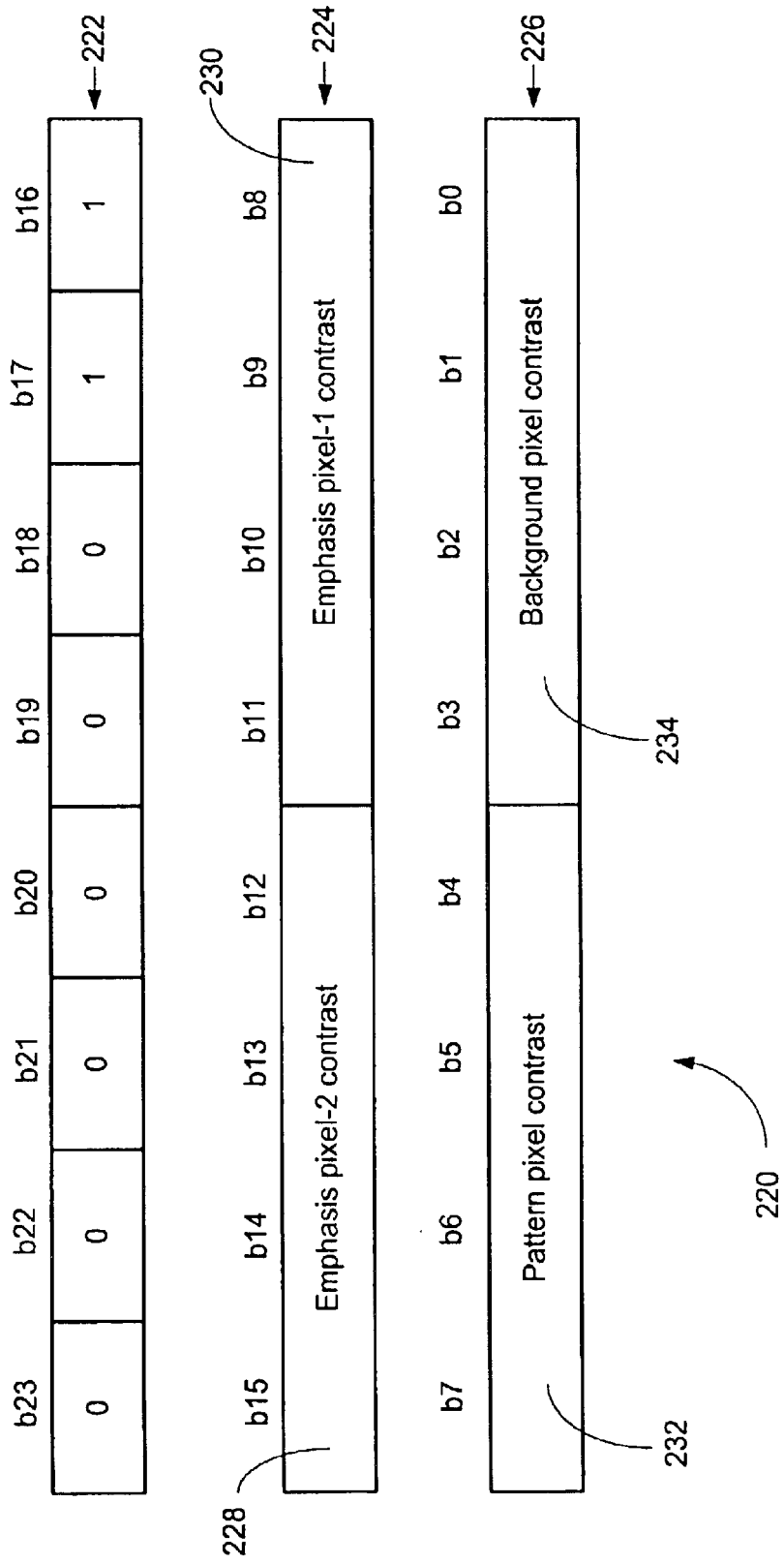
FIG. 9 is a block diagram illustrating the bit layout of a set contrast (SET_CONTR) command.

The next SP_DCCMD command is "04fff0." The "04" means that the command is a SET_CONTR command (see Table 3), which is handled by second processing unit 54 in a manner similar to the SET_COLOR command. FIG. 9 illustrates the structure 220 of a SET_CONTR command. Structure 220 is similar to the SET_COLOR command structure 200 in that it comprises three bytes 222, 224, 226. Byte 222 is the command code for the SET_CONTR command and has the value "04". Byte 224 and 226 include four 4-bit values which define four different pixel contrast codes. For example, byte 224 includes Emphasis pixel-2 contrast code field 228, and Emphasis pixel-1 contrast code field 230, and byte 226 includes Pattern pixel contrast code field 232 and Background pixel contrast code field 234. As with the color codes, a 2-bit pixel value is used to select one of the four different contrast codes.

In accordance with this particular example, the SET_CONTR command has the value "04fff0" Thus, fields 228, 230 and 232 all have the value "f" (1111 binary), while background pixel contrast code field 234 has the value "0" (0000 binary). Second processing unit 54 will store the command data in memory and then extract it from memory and issue it to subpicture hardware unit 62 at the appropriate time. As with the SET_COLOR command, second processing unit 62 decodes and processes the SET_CONTR command, so the command does not need to pass through pipeline 102 of subpicture hardware unit 62. Rather, the contrast values (fields 228–234) are transmitted directly into a subpicture contrast register 120 in hardware unit 62. From register 120, the contrast values pass through color/contrast control logic unit 116 into current contrast register 124. Like the color values, the contrast values are transmitted from second processing unit 54 into register 120 via a communication bus.

Figure 10:
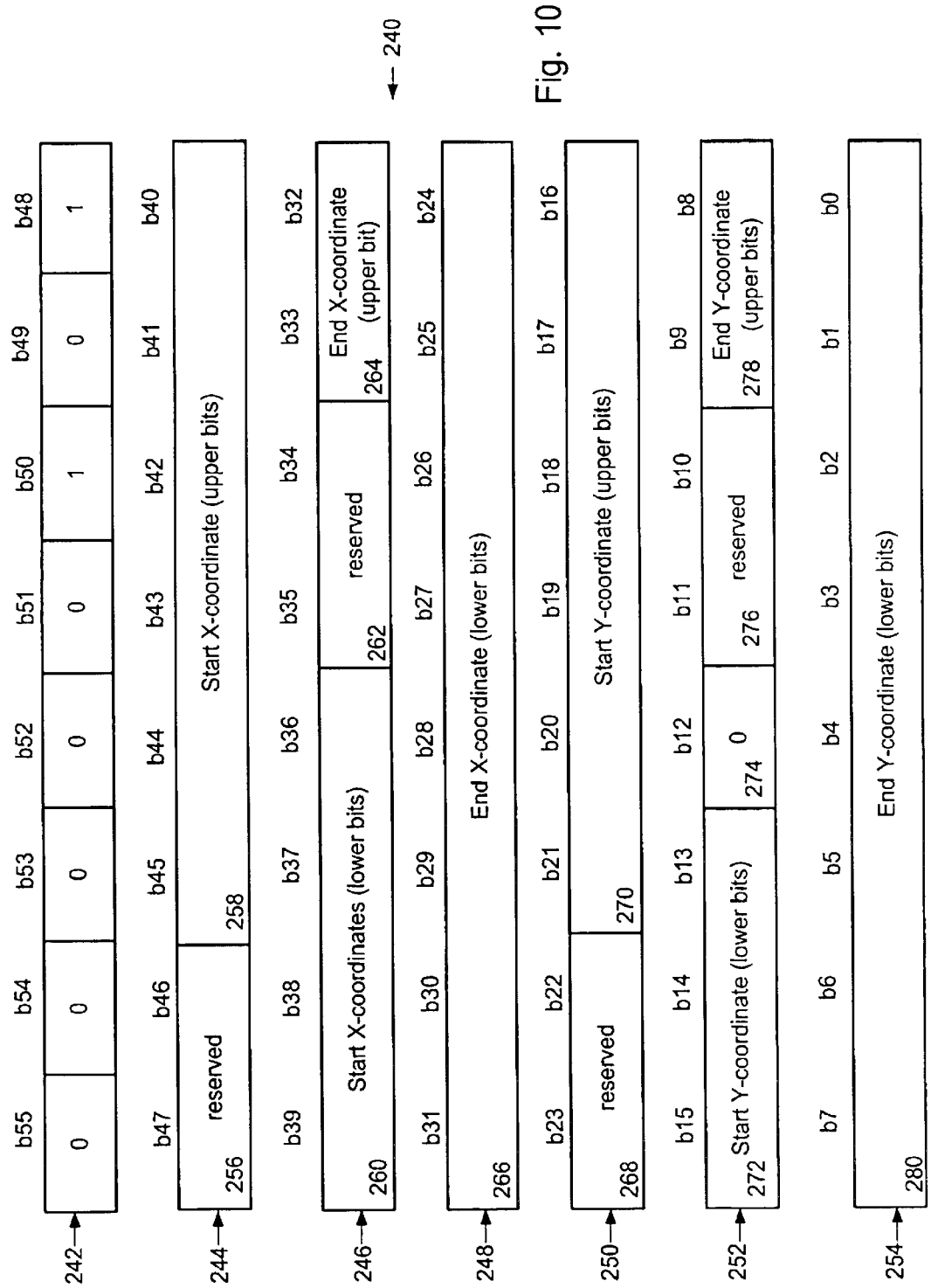
FIG. 10 is a block diagram illustrating the bit layout of a set display area (SET_DAREA) command.

The next SP_DCCMD command begins with "05," which means it's a SET_DAREA command. As illustrated in FIG. 10, the SET_DAREA command 240 includes 7 bytes. Therefore, the entire SET_DAREA command value is "0506e2610c812b." The SET_DAREA command defines the X and Y coordinates of the subpicture display area. The first byte 242 of the SET-DAREA command is the command code and has the value "05." Byte 244 includes two reserved bits 256, and the six upper bits 258 of a Start X-coordinate field. Byte 246 includes the four lower bits 260 of the Start X-coordinate field, two reserved bits 262, and two upper bits 264 of an End X-coordinate field. The lower 8 bits of the End X-coordinate field are in byte 248. Byte 250 includes two reserved bits 268 and six upper bits 270 of a Start Y-coordinate field. Byte 252 includes the four lower bits 272, 274 of the Start Y-coordinate field, two reserved bits 276, and two upper bits 278 of an End Y-coordinate field. The lower 8 bits of the End Y-coordinate field are in byte 254. The value of the Start Y-coordinate is always an even number, therefore, bit 274 is always set to zero.

In this particular example, the bytes 244–248 have the value "06e261." Thus, the Start X-coordinate has the value "06e" (0000 0110 1110 binary), and the End X-coordinate has the value "261" (0010 0110 0001). Similarly, bytes 250–254 have the value "0c812b." Thus, the Start Y-coordinate value is "0c8" (0000 1100 1000 binary), and End Y-coordinate value is "12b" (0001 0010 1011 binary). Second processing unit 54 will use this information to set up various registers within subpicture hardware unit 62, including a "subPCount" register 122. In particular, subPCount register 122 holds the horizontal size of the subpicture display. Therefore, the value loaded into subPCount register 122 is the End X-coordinate value minus the Start X-coordinate value ("261"-"06e"="1f3" (0001 1111 0011 binary). As with the SET_COLOR and SET_CONTR commands, second processing unit 54 can load the value directly into subPCount register 122 using the communication bus.

Figure 11:
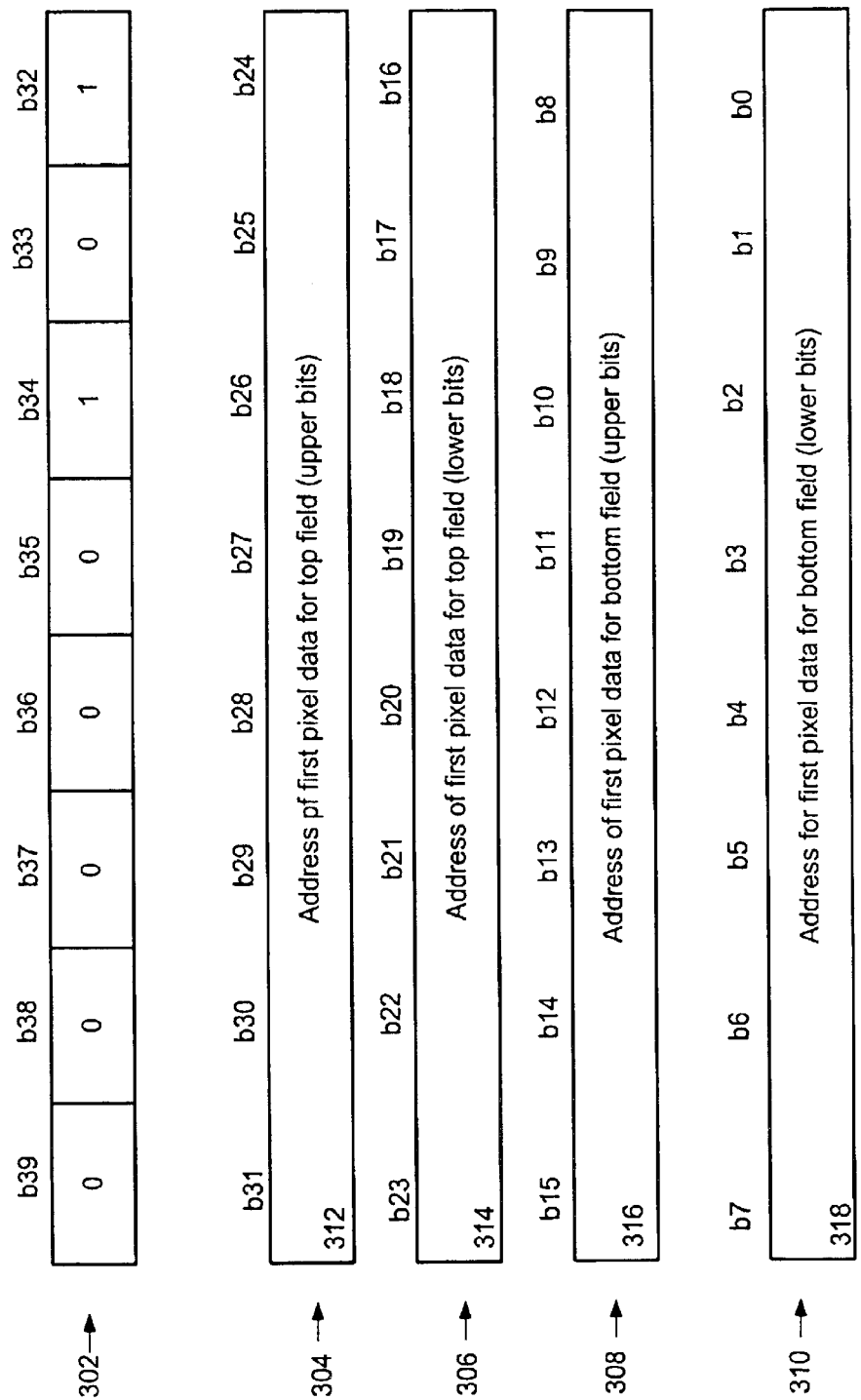
FIG. 11 is a block diagram illustrating the bit layout of a set start address of pixel data (SET_DSPXA) command.

The next command begins with "06," which means it's a SET_DSPXA command. As illustrated in FIG. 11, the SET_DSPXA command 300 includes 5 bytes 302–310. Therefore, the entire SET_DSPXA command value is "06000403bc." The SET_DSPXA command defines the addresses for the PXD data for both the top and bottom fields. First byte 302 is the command code and has the value "06." Byte 304 includes the upper bits 312 of the address of the fist pixel data for top field (value="00"), and byte 306 includes the lower bits 314 of the address of the first pixel data for top field (value="04"). Similarly, byte 308 includes the upper bits 316 of the address of the fist pixel data for bottom field (value="03"), and byte 310 includes the lower bits 318 of the address of the first pixel data for bottom field (value="bc"). The addresses are given as relative byte numbers (RBN) from the first byte of the SPU. Thus, the address of the first pixel data for the top field is at 40134012+0004=40134016 (byte 192), and the address of the first pixel data for the bottom field is at 40134012+03bc 401343ce (row 194, byte 196).

The next command "01" gives the STA_DSP command, which set the start of the display. The next command "FF" is the normal CMD_END (End of Command Sequence).

The first SP_DCSQ did not include any CHG_COLCON commands, which means the whole display has the same color and contrast. The second SP_DCSQ begins at byte 188 and is as follows:

"01b707c2 07001600 c8212b00 6eaf0a00 000088af 0afff00ffffff"

Figure 12:
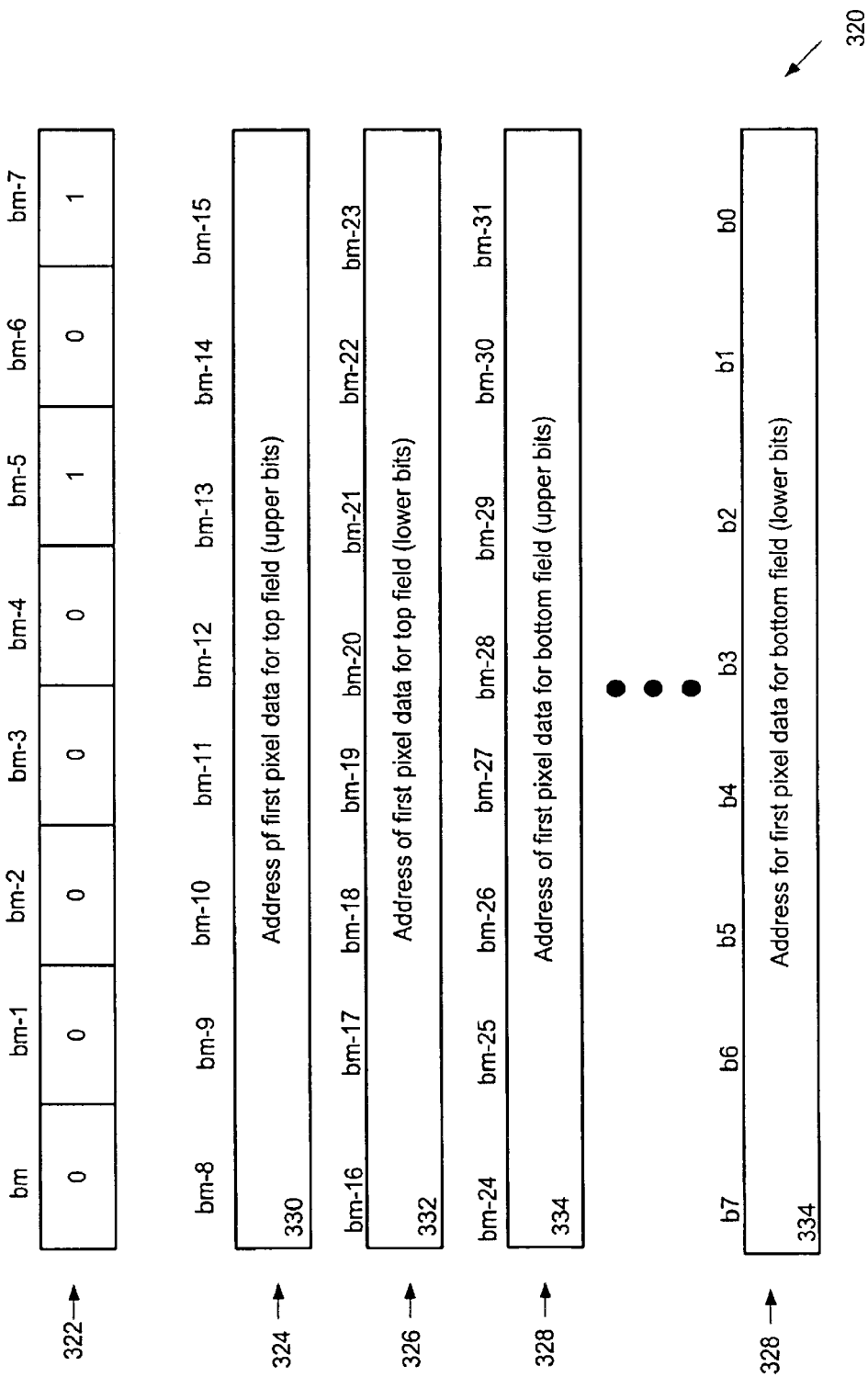
FIG. 12 is a block diagram illustrating the bit layout of a change color/contrast (CHG_COLCON) command.

As discussed above, the first two bytes of the SP_DCSQ is the SP_DCSQ_STM (Start Time of SP_DCSQ), which has the value "01b7". The next two bytes is the SP_NXT_DCSQ_SA (Address of Next SP_DCSQ), which has the value "07c2," which is given as a RBN from the first byte of SPU. Hence the address of the next SP_DCSQ is 40134012+07c2=401347d4 (byte 196). The first SP_DCCMD command of the SP_DCSQ begins with "07," which means the command is a CHG_COLCON command. The entire command line for the CHG_COLCON command is "07001600 c8212b00 6eaf0a00 000088af 0afff00ffffff." As illustrated in FIG. 12, byte 322 comprises the command code and bytes 324 and 326 include the extended field size for the CHG_COLCON command. Byte 324 includes the upper 8-bits 330 of the extended field size, and byte 326 includes the lower 8-bits 332 of the extended field size. As one skilled in the art will appreciate, the extended field size value gives the size of the pixel control data (PXCD) in the command body. As illustrated in FIG. 12, bytes 328 hold the pixel control data 334, which is variable in size. In accordance with the particular example set forth herein, the extended field bytes 324–326 have the value "0016." Thus the pixel control data size is 22 bytes.

Embedded within each of the CHG_COLCON commands are sets of LN_CTLI and corresponding PX_CTLI information. Each piece of LN_CTLI information has one or more pieces of PX_CTLI information associated with it. The LN_CTLI information includes the line number on which to start the color/contrast changes, the line number on which to stop the color/contrast changes, and the total number of changes in the line(s). As illustrated in FIG. 13, LN_CTLI information is four bytes long (342–348). The upper six bits 350 of byte 342 are reserved bits. The upper two bits 352 of byte 342 correspond to the upper bits of the change start line number. The lower eight bits of the change start line number reside in byte 344. The upper four bits 356 of byte 346 hold the number of changes, the next two bits 358 are reserved, the lower two bits 360 of byte 346 hold the upper bits of the change termination line number. Byte 348 holds the lower eight bits 362 of the change termination line number.

In accordance with this particular example, the first LN_CTLI is "00c8212b." Thus, the change start line number value is "0c8," the number of changes (i.e., the number of PX_CTLI) value is "2," and the change termination line number value is "12b." Looking back at the SET_DAREA command, the first line number (Y-coordinate) for the subpicture display area is "0c8," and the last line number (Y-coordinate) for the subpicture display area is "12b." Thus, in this particular example, the PX_CTLI commands are applied to the whole subpicture display area. The number of PX_CTLI commands is two, which means that there are two "change color commands" which start at two different "change start pixel numbers." The two PX_CTLI commands follow the LN_CTLI information and have the values "006eaf0a0000" and "0088af0afff0," respectively.

Figure 14:
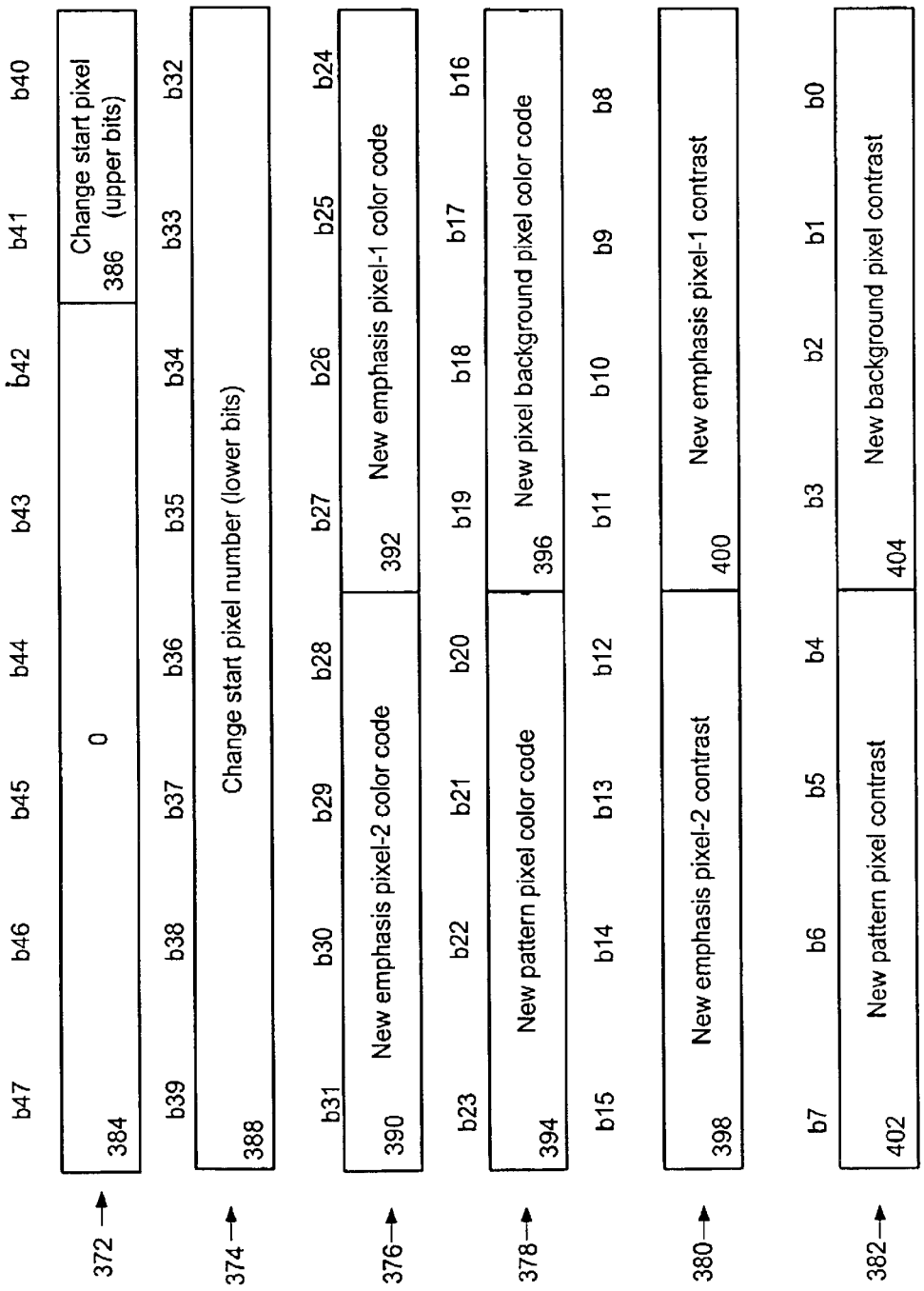
FIG. 14 is a block diagram illustrating the bit layout of pixel control information (PX_CTL) of a CHG_COLCON command.

As illustrated in FIG. 14, PX_CTLI commands comprise six bytes of data. The upper six bits 384 of byte 372 are reserved. The lower two bits 386 of byte 372 hold the upper two bits of the change start pixel number (i.e. the pixel at which the change color command is to begin). Byte 374 holds the lower eight bits 388 of the change start pixel number. Bytes 376 and 378 hold the new color values, and bytes 380 and 382 hold the new contrast values. Thus, all pixels beginning at the start pixel number will have the new color and contrast values.

In accordance with the present example, the value of the first PX_CTLI is "006eaf0a00000." Thus, the first change start pixel number value is "6e." The new emphasis pixel-2 color code value is "a," the new emphasis pixel-1 color code value is "f," the new pattern pixel color code value is "0," the new background pixel color code value is "a", the new emphasis pixel-2 value is "0," the new emphasis pixel-2 contrast value is "0," the new pattern pixel contrast value is "0," and the new background pixel contrast value is "0."

Similarly, the second PX_CTLI is "0088af0aff0." Thus, the second change start pixel number value is "88," and the new color and contrast values for the second PX_CTLI are as follows: the new emphasis pixel-2 color code value is "a;" the new emphasis pixel-1 color code value is "f," the new pattern pixel color code value is "0;" the new background pixel color code value is "a;" the new emphasis pixel-2 contrast value is "f;" the new emphasis pixel-2 contrast value is "f;" the new pattern pixel contrast value is "f;" and the new background pixel contrast value is "0."

At display time, the SP_DCSQT is moved from system memory 56 to fast local memory 58, where second processing unit 54 parses the command data (see FIG. 4). The PX_CTLI structures then are transmitted to control FIFO buffer 108 in pipeline 102 of subpicture hardware unit 62, where they are processed in order. At or about the same time, the PXD data is transferred into PXD FIFO buffer 110 of pipeline 104.

Referring now to FIG. 6, the operation of subpicture hardware unit 62 will be discussed. As discussed above, certain subpicture display commands (i.e., SET_COLOR, SET_CONTR, SET_DAREA, SET_DSPXA, etc.) can be "executed" by second processing unit 54. In executing these commands, second processing unit 54 extracts command information from the command and transmits it to registers in subpicture hardware unit 62. In addition, second processing 54 unit preferably controls the transfer of pixel data to subpicture hardware unit 62. The pixel data transferred to subpicture hardware unit 62 is the data for the pixels being "controlled by" the subpicture display control commands. For example, for the SET_COLOR and SET_CONTR commands, the pixel data includes run-length encoded pixels which are to have the color and contrast values set by the SET_COLOR and SET_CONTR commands.

For the SET_COLOR and SET_CONTR commands, second processing unit 54 loads four color values (i.e., emphasis pixel-2 color code, emphasis pixel-1 color code, pattern pixel color code, and background pixel color code) into subpicture color register 118. Similarly, for the SET_CONTR command, second processing unit 54 loads four contrast values (ie., emphasis pixel-2 contrast code, emphasis pixel-1 contrast code, pattern pixel contrast code, and background pixel contrast code) into subpicture contrast register 120. From registers 118 and 120, the color and contrast values pass to color/contrast control logic 116, which loads the values into current color register 126 and current contrast register 124, respectively. At this point, the subpicture pixels displayed on the display screen will have a color value selected from one of the four colors values loaded in current color register 126, and will have a contrast value selected from one of the four contrast values loaded into current contrast register 124.

Subpicture hardware unit 62 receives the pixel data (PXD) from second processing unit 54 via system bus DMA 106. The pixel data enters pipeline 104 and is held in pixel data FIFO 110. At the appropriate time, the pixel data is extracted from pixel data FIFO 110 and handled by PXD processing logic 114 of pipeline 104. PXD processing logic preferably separates the PXD data into its separate run-length encoded data strings. Then, the run-length encoded data strings pass to run-length decoder 128 for decoding. As one skilled in the art will appreciate, run-length encoded data strings include two bits of pixel data and a variable number of bits that define the number of consecutive pixels that have the same color and contrast values defined by the two bits of pixel data. Pixel run-length encoding and decoding is well known in the art, so it will not be discussed in detail herein.

As illustrated in FIG. 6, the output of run-length decoder 128 comprises run data and pixel data. The run data is placed in run data register 130, and sets forth the number of pixels in a line that have the color and contrast values defined by the pixel data. The pixel data comprises two bits and is placed in pixel data register 132. The current color values stored in register(s) 126 and the current contrast values stored in register(s) 124 comprise four different values defined as background pixel, pattern pixel, emphasis pixel-1, and emphasis pixel-2. The two bits of pixel data are used to extract one of the four different pixel types for the string of pixels defined by the run data. Table 2 above sets forth how the two bits of pixel data correspond to the four different types of pixels.

In accordance with a particular example, assume a single run-length encoded data unit includes the value "00011010." In accordance with standard run-length compression rules, the pixel data has the value "10," and the number of pixels that have that pixel data value is "0110" (value=6). The pixel data value "10" from register 132 is used by contrast logic unit 134 and color logic unit 136 to obtain the associated color and contrast values. For the contrast value, contrast logic unit 136 uses the value "10" to select the associated contrast value from current contrast register 124. As shown in Table 2 above, the value "10" is associated with the emphasis pixel-1 value. Thus, the six pixels associated with the pixel data value "10" will have the contrast value that was assigned to the emphasis pixel-1 bits in the current contrast register 124 during the execution of the SET_CONTR command. The contrast value is a 4-bit value, which passes from contrast logic unit 136 to output control logic 142.

For the color value, color logic unit 134 uses the value "10" to select the associated color value from current color register 126. Thus, the six pixels associated with the pixel data value "10" will have the color value that was assigned to the emphasis pixel-1 bits in the current color register 126 during the execution of the SET_COLOR command. The color value from color control logic is a 4-bit value. However, the color value for the pixels preferably comprises a 32-bit color value selected from a 256 color, color look-up table 140. As one skilled in the art will appreciate, 8 bits are needed to select one of the 256 different colors. Thus, the 4-bit value from color logic unit 134 is combined with a color look-up table select value stored in register 138. The color look-up table select value comprises the upper 4 bits of the value used to select the 32-bit value from table 140, while the 4-bit color value from color logic unit 134 comprises the lower 4 bits of the 8-bit color look-up value. Thus, the upper 4 bits defines a block of 16 colors in the color look-up table from which the pixel color can be selected, and the lower 4 bits defines the color to be selected from the group of 16 colors. By changing the color look-up table select value stored in register 138, and/or the pixel color values in current color register 126, any of the 256 colors can be used in the subpicture.

From color look-up table 140, the 32-bit color value is passed to output control logic 142. Output control logic 142 preferably applies the 32-bit color value and the 4-bit contrast value to the number of pixels (in this case 6) and outputs the subpicture pixel stream to combiner 80 in display unit 60 (see FIG. 5). Preferably, output control logic 142 converts the color and contrast value to YCbCr format prior to output.

As discussed above, the change color/contrast commands (CHG_COLCON) comprise line control information (LN_CTLI) and pixel control information (PX_CTLI). The LN_CTLI information can be processed by second processing unit 54 or by subpicture hardware unit 62, because the commands are not pixel independent. However, the PX_CTLI information controls the subpicture display on a pixel-by-pixel basis, and thus, should be processed by subpicture hardware unit 62. In accordance with this aspect of the invention, second processing unit preferably extracts the PX_CTLI information from the CHG_COLCON commands, and then transmits the PX_CTLI to control command FIFO 108 in pipeline 102 of the subpicture hardware unit. From control command FIFO 108, the PX_CTLI passes to command processing logic 112, where it is parsed and processed. From command processing logic 112, new color and contrast information extracted from the PX_CTLI passes to color/contrast control logic 116 for further processing. From color/contrast control logic 116, the new contrast information is loaded into current contrast register 124, and the new color information is loaded into current color register 126.

As the CHG_COLCON command is being processed by pipeline 102, pipeline 104 is processing the pixel data associated with the CHG_COLCON command. Thus, as current contrast register 124 and current color register 126 are loaded with new contrast and color values, the pixels which are to be assigned color and contrast values from the new color and contrast tables are decoded. As discussed above, the pixel data from register 132 is used to select one of four color and contrast values from current contrast register 124 and current color register 126. Output logic 142 then uses the color and contrast information to generate YCbCr values for output.

In conclusion, the present invention provides novel methods and apparatus for processing subpicture data, which is part of a DVD-video stream. While a detailed description of presently preferred embodiments of the invention have been given above, various alternatives, modifications, and equivalents will be apparent to those skilled in the art. For example, while the system in described herein as having two processing units and a subpicture hardware unit, one skilled in the art will appreciate that any number of processing units and hardware units may be used without varying from the spirit of the invention. Therefore, the above description should not be taken as limiting the scope of the invention, which is defined by the appended claims.

What is claimed is:

1. A subpicture decode and execution system, comprising:
   a first processor arranged to parse a received video data stream into a number of separate packs some of which are subpicture video packs; and
   a second processor coupled to the first processor arranged to receive the subpicture video packs from the first processor, wherein the second processor processes a received subpicture video pack to provide a subpicture pixel data (PXD), a subpicture control command data (SP DCSQT), a pixel data pointer (PTR) that points to an associated subpicture pixel data (PXD) and a corresponding pointer time stamp (PTS) that indicates a time that a particular subpixel data (PXD) pointed to by a corresponding pointer PTR will be needed for further processing and video object unit (VOBU) information.

2. A system a recited in claim 1, further comprising:
   a system memory unit coupled to the second processor wherein for a particular PXD and SP DCSQT, comprising:
   a PXD data structure for storing the PXD;
   a SP DCSQT data structure for storing the SP DCSQT;
   a PTR data structure for storing the PTR corresponding to the stored PXD wherein the stored PTR points to the stored PXD;
   a PTS data structure for storing the PTS corresponding to the stored PTR; and
   a VOBU data structure for storing the VOBU.

3. A system as recited in claim 1, wherein VOBU information includes information, for a video object unit that includes presentation starting time, presentation termination time, and presentation period.

4. A system as recited in claim 1, further comprising:
   a fast local memory coupled to the system memory; and
   a time manager module arranged to transfer PXD from the PXD data structure and an associated SP DCSQT from the SP DCSQT data structure into the fast local memory when needed for the further processing.

5. A system as recited in claim 4, wherein the time manger module is incorporated into the second processor and wherein the fast local memory is in close proximity to the second processor.

6. A system as recited in claim 1, further comprising:
a display unit coupled to the system for displaying the further processed subpicture pixel data.

7. A system as recited in claim 6, further comprising:
a dedicated hardware subpicture unit coupled to the display unit, the local memory, and the second processor for performing the further processing.

8. A system as recited in claim 1, wherein the system is incorporated into a DVD player or a set top box or an LCD TV.

9. A system as recited in claim 1 wherein the subpicture control command data includes pixel color information, pixel contrast information, or subpicture display area information.

10. A method of decoding subpicture video packs, comprising:
parsing a received video data into a number of separate packs by a first processor;
determining a pack type;
when some of the packs are subpicture video packs, forwarding the subpicture video packs to a second processor; and
providing a subpicture pixel data (PXD), a subpicture control command data (SP DCSQT), a pixel data pointer (PTR) that points to an associated subpicture pixel data (PXD) and a corresponding pointer time stamp (PTS) that indicates a time that a particular subpixel data (PXD) pointed to by a corresponding pointer PTR will be needed for further processing and video object unit (VOBU) information by the second processor.

11. A method as recited in claim 10, further comprising:
coupling a memory unit to the second processor wherein for a particular PXD and SP DCSQT, further comprising:
storing the PXD in a PXD data structure;
storing the SP DCSQT in a SP DCSQT data structure;
storing the PTR corresponding to the stored PXD in a PTR data structure wherein the stored PTR points to the stored PXD;
storing the PTS corresponding to the stored PTR in a PTS data structure; and
storing the VOBU in a VOBU data structure.

12. A method as recited in claim 11, wherein VOBU information includes information, for a video object unit that includes presentation start time, presentation termination time, and presentation period.

13. A method as recited in claim 11, further comprising:
when needed for the further processing, transferring PXD from the PXD data structure and an associated SP DCSQT from the SP DCSQT data structure into a fast local memory that is coupled to the system memory by a time manager module.

14. A method as recited in claim 13, wherein th time manager module is incorporated into the second processor and wherein the fast local memory is in close proximity to the second processor.

15. A method as recited in claim 10, further comprising:
displaying the further processed subpicture pixel data by a display unit coupled to the system.

16. A method as recited in claim 15, further comprising:
performing the further processing by a dedicated hardware subpicture unit coupled to the display unit, the local memory, and the second processor.

17. A method as recited in claim 10, wherein the method is performed by a DVD player or a set top box or an LCD TV or a computer monitor.

18. A method as recited in claim 10, wherein in the subpicture control command data includes pixel color information, pixel contrast information, or subpicture display area information.

19. Computer program product for decoding subpicture video packs, comprising:
computer code for parsing a received video data stream into a number of separate packs by a first processor;
computer code for determining a pack type;
computer code for forwarding the subpicture video packs to a second processor when some of the packs are subpicture video packs;
computer code for providing a subpicture pixel data (PXD), a subpicture control command data (SP DCSQT), a pixel data pointer (PTR) that points to an associated subpicture pixel data (PXD) and a corresponding pointer time stamp (PTS) that indicates a time that a particular subpixel data (PXD) pointed to by a corresponding pointer PTR will be needed for further processing and video object unit (VOBU) information by the second processor; and
computer readable medium for storing the computer code.

20. Computer program product as recited in claim 19, further comprising:
computer code for coupling a memory unit to the second processor wherein for a particular PXD and SP DCSQT, further comprising:
computer code for storing the PXD in a PXD data structure;
computer code for storing the SP DCSQT in a SP DCSQT data structure;
computer code for storing the PTR corresponding to the stored PXD in a PTR data structure wherein the stored PTR points to the stored PXD;
computer code for storing the PTS corresponding to the stored PTR in a PTS data structure; and
computer code for storing the VOBU in a VOBU data structure.

21. Computer program product as recited in claim 20, wherein VOBU information includes information, for a video object unit that includes presentation starting time, presentation termination time, and presentation period.

22. Computer program product as recited in claim 20, further comprising:
when needed for the further processing, transforming PXD from the PXD data structure and an associated SP DCSQT from the SP DCSQT data structure into a fast local memory that is coupled to the system memory by a time manager module.

23. Computer program product as recited in claim 22, wherein the time manager module is incorporated into the second processor and wherein the fast local memory is in close proximity to the second processor.

24. Computer program product as recited in claim 19, further comprising:

displaying the further processed subpicture pixel data by a display unit coupled to the system.

25. Computer program product as recited in claim 24, further comprising:

performing the further processing by a dedicated hardware subpicture unit coupled to the display unit, the local memory, and the second processor.

26. Computer program product as recited in claim 19, wherein the method is performed by a DVD player or a set top box or an LCD TV or a computer monitor.

27. Computer program product as recited in claim 19 wherein the subpicture control command data includes pixel color information, pixel contrast information, or subpicture display area information.

* * * * *

UNITED STATES PATENT AND TRADEMARK OFFICE
CERTIFICATE OF CORRECTION

PATENT NO. : 6,871,008 B1
DATED : March 22, 2005
INVENTOR(S) : Pintz et al.

It is certified that error appears in the above-identified patent and that said Letters Patent is hereby corrected as shown below:

Column 3,
Line 37, change "PX_CTL" to -- PX_CTLI --.

Column 6,
Line 7, change "fist data" to -- first data --.

Column 14,
Line 45, change "a recited" to -- as recited --.

Column 15,
Line 1, change "time manger" to -- time manager --.
Line 21, change "data" to -- data stream --.
Line 53, change "start time" to -- starting time --.
Line 61, change "th time" to -- the time --.

Column 16,
Line 9, delete the second instance of "in".
Line 58, change "transforming" to -- transferring --.

Signed and Sealed this

Sixteenth Day of August, 2005

JON W. DUDAS
*Director of the United States Patent and Trademark Office*